United States Patent [19]

Kobayashi

[11] Patent Number: 4,672,283

[45] Date of Patent: Jun. 9, 1987

[54] CONTROL CIRCUIT FOR STEPPING MOTOR

[75] Inventor: Mamoru Kobayashi, Atsugi, Japan

[73] Assignee: Tokico Ltd., Kawasaki, Japan

[21] Appl. No.: 810,290

[22] Filed: Dec. 18, 1985

[30] Foreign Application Priority Data

Dec. 20, 1984 [JP] Japan .............................. 59-193502[U]

[51] Int. Cl.$^4$ .............................................. H02P 8/00
[52] U.S. Cl. ..................................... 318/696; 318/685
[58] Field of Search ................. 318/696, 685; 364/511

[56] References Cited

U.S. PATENT DOCUMENTS 4,220,995   9/1980   Shoda .................................. 364/508

Primary Examiner—William M. Shoop, Jr.
Assistant Examiner—Saul M. Bergmann
Attorney, Agent, or Firm—Cushman, Darby & Cushman

[57] ABSTRACT

A control circuit can drive a stepping motor within a wide supply voltage range without step-out of the rotor. The control circuit includes an A/D converter for converting the supply voltage to the stepping motor into a digital data and a register for temporarily storing the number of steps by which the stepping motor is rotated. The control circuit also includes a memory having a plurality of storage areas in each of which a plurality of speed pattern data are stored, the plurality of speed pattern data corresponding respectively to different levels of the supply voltage. One of the plurality of speed pattern data is selectively read in accordance with the output of the A/D converter from the storage areas which corresponds to the number of the steps. And, the stepping motor is driven in accordance with the read speed pattern data.

4 Claims, 5 Drawing Figures

CONTROL CIRCUIT FOR STEPPING MOTOR

BACKGROUND OF THE INVENTION

1. Field of the Invention

This invention relates to a control circuit for driving a stepping motor which is suitable for use, for example, in a magnetic disc storage unit.

2. Prior Art

There has been proposed a disc storage unit in which a seek operation to move the heads to the desired cylinder is performed by means of a stepping motor. And, it is known in the art that the stepping motor can be controlled by a control circuit in such a manner that the rotor thereof is accelerated and decelerated in accordance with a predetermined unique speed pattern previously stored in an associated memory. However, such a conventional motor control circuit suffers from a deficiency that the rotor steps out when the supply voltage to the stepping motor becomes greater or less than the nominal value by a certain amount, since the stepping motor is driven in accordance with the same speed pattern regardless of the variation of the supply voltage.

SUMMARY OF THE INVENTION

It is therefore an object of the present invention to provide a control circuit for a stepping motor which can drive the stepping motor so that a step out of the rotor does not occur even when the supply voltage thereto varies to a certain extent.

According to an aspect of the present invention, there is provided a control circuit for controlling the operation of a stepping motor having windings which are supplied with a voltage from a voltage source comprising voltage detecting means for detecting a level of the voltage to output a detection signal; memory means for storing a plurality of speed pattern data corresponding respectively to different levels of the voltage; reading means for selectively reading one of the plurality of speed pattern data in accordance with the detection signal; and drive means for causing phase currents to flow from the voltage source into the windings in accordance with the speed pattern data read from the memory means. The control circuit may further comprise register means for receiving the number of steps by which the stepping motor is operated.

DESCRIPTION OF THE PREFERRED EMBODIMENT OF THE INVENTION

A control circuit for a stepping motor provided in accordance with the present invention will now described with reference to the drawings.

Figure 1:
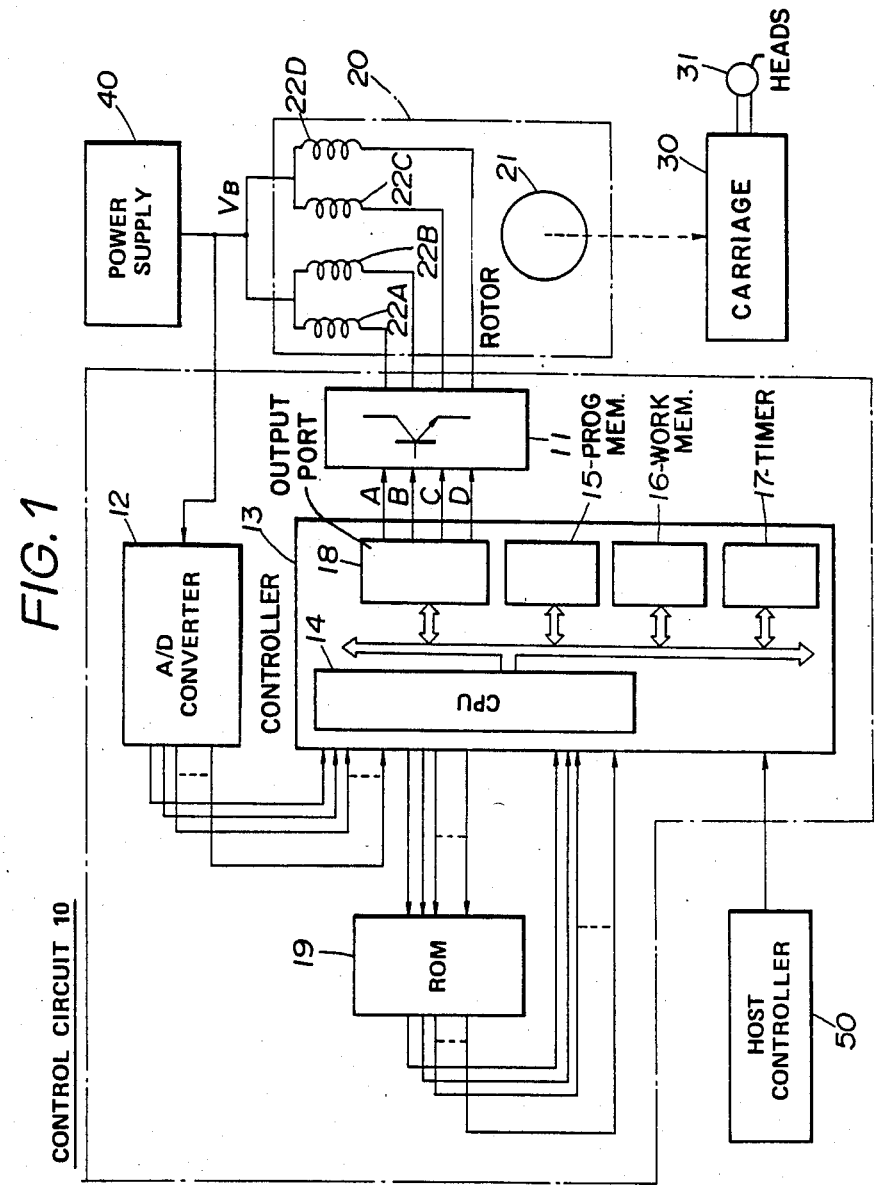
FIG. 1 is a block diagram of a control circuit for a stepping motor provided in accordance with the present invention.

Referring now to FIG. 1, there is shown a control circuit 10 for driving a stepping motor 20 which is adapted for use in a disc storage unit. A rotor 21 of the stepping motor 20 is operatively connected to a carriage 30 of heads 31 of the disc storage unit. Stator windings 22A to 22D of the stepping motor 20 are supplied at one terminal with a positive DC voltage $V_B$ outputted from a power supply 40. The other terminals of the windings 22A to 22D are connected to output terminals of a driver circuit 11 provided in the control circuit 10. The control circuit 10 further comprises an analog-to-digital converter (hereinafter referred to as "A/D converter") 12 for converting the output voltage $V_B$ of the power supply 40 into a digital data. The digital data outputted from the A/D converter 12 is supplied to a controller 13 which comprises a CPU (Central Processing Unit) 14, a program memory 15, a work memory 16, a timer circuit 17 and an output port 18. The program memory 15 stores therein programs to be executed by the CPU 14 for controlling the rotation and speed of the stepping motor 20. The timer circuit 17 is of the type which is triggered by the CPU 14 and outputs to the CPU 14 a timing signal when a time interval determined by the timer data supplied from the CPU 14 has lapsed. The output port 18 has four output terminals for outputting, under the control of the CPU 14, four phase signals A, B, C and D, one of them being selectively rendered "1". For example, when the phase signals A, B, C and D are sequentially rendered "1", the windings 22A, 22B, 22C and 22D are sequentially energized, whereby the rotor 21 is rotated by four steps. On the other hand, when the states of the four phase signals A to D do not change, the rotor 21 remains stationary. The CPU 14 is also connected to a ROM (Read Only Memory) 19 in which a plurality of speed control data are stored. The CPU 14 selectively reads, under the control of the program stored in the program memory 15, one of the speed control data from the ROM 19 in accordance with the output data of the A/D converter 12, and causes the states of the phase signals A to D to change when a time interval determined by the read speed control data has lapsed. And by repeating the above operation, the control circuit 10 can rotate the stepping motor 20 in accordance with the desired speed pattern.

The speed control data stored in the ROM 19 will now be more fully described.

Figure 2:
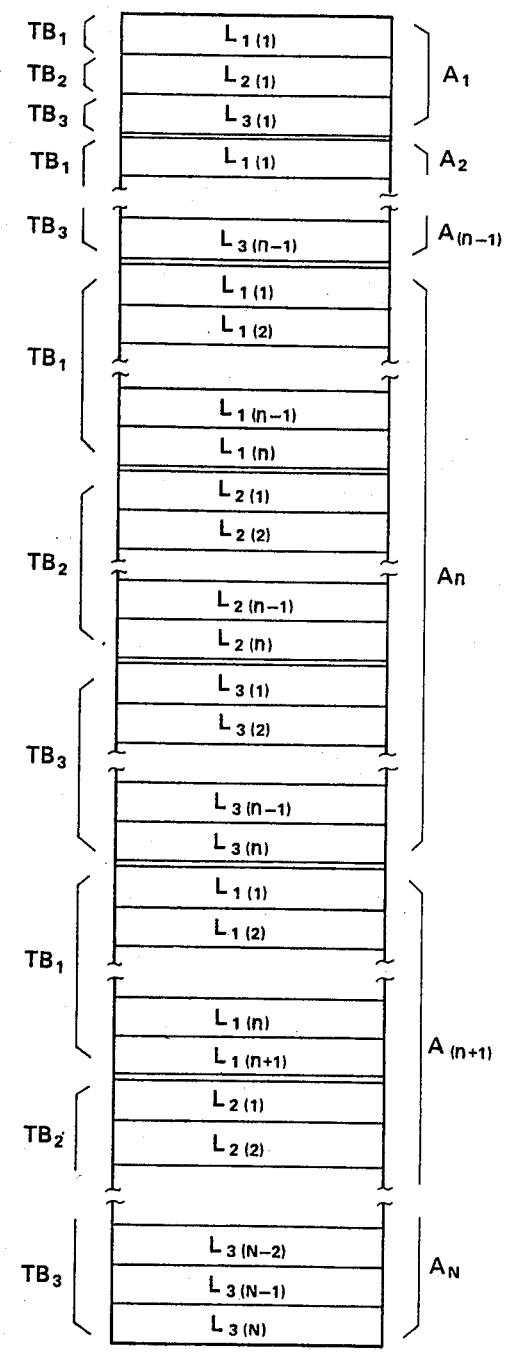
FIG. 2 is an illustration showing the speed control data stored in the ROM 19 of the control circuit 10 of FIG. 1.

As shown in FIG. 2, the ROM 19 is divided into a plurality of storage areas $A_1$ to $A_N$, wherein the suffix of each reference character "A" indicates the number of the cylinders which the heads pass to achieve a seek operation. For example, when the number of the cylinders to be passed is "n" the area $A_n$ is selected, and when the number of the cylinders to be passed is "n+1" the area $A_{(n+1)}$ is selected. Each of the areas $A_1$ to $A_N$ stores therein three groups of speed control data respectively as tables $TB_1$, $TB_2$ and $TB_3$. Three tables $TB_1$, $TB_2$ and $TB_3$ in the same area are composed of the same number of memory locations which corresponds to the number of the cylinders to be passed. For example, the tables $TB_1$, $TB_2$ and $TB_3$ in the area $A_n$ are composed respectively of memory locations $L_{1(i)}$, $L_{2(i)}$ and $L_{3(i)}$, wherein "i" represents 1, 2, 3, . . . n. Thus, the area $A_n$ is composed of 3 x n memory locations. On the other hand, the tables $T_1$, $T_2$ and $T_3$ in the area $A_{(n+1)}$ are composed respectively of memory locations $L_{1(i)}$, $L_{2(i)}$ and $L_{3(i)}$, wherein "i" represents 1, 2, 3, . . . (n+1), so that the area $A_{(n+1)}$ is composed of $3 \times (n+1)$ memory locations.

The speed control data stored in each of the memory locations $L_{1(i)}$, $L_{2(i)}$ and $L_{3(i)}$ will now be described with reference to FIG. 3.

Figure 3:
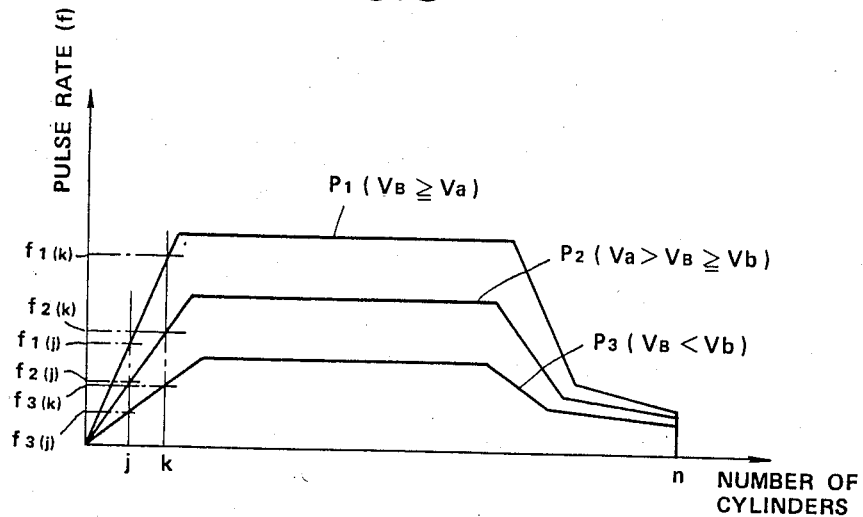
FIG. 3 is a graph showing the optimum speed patterns of the stepping motor experimentally obtained at the three different supply voltages when the heads are moved across cylinders of which number is "n"

FIG. 3 shows the relation between the number of the cylinders to be passed and the rate of change of the states of the phase signals A to D, i.e., the pulse rate f or the rotation speed of the rotor 21, in a seek operation wherein the number of the cylinders to be passed is "n". In FIG. 3, the line P1 represents the optimum variation of pulse rate (or the optimum speed pattern) for the stepping motor 20 experimentally obtained when the supply voltage $V_B$ is not less than a first reference voltage $V_a$ which is greater than the nominal supply voltage of the stepping motor 20 by a certain amount ($V_B \geq V_a$). The line P2 represents the optimum speed pattern experimentally obtained when the supply voltage $V_B$ is less than the first reference voltage $V_a$ but not less than a second reference voltage $V_b$ which is less than the nominal supply voltage by a certain amount ($V_a > V_B \geq V_b$). Similarly, the line P3 represents the optimum speed pattern experimentally obtained when the supply voltage $V_B$ is less than the second reference voltage $V_b$ ($V_B < V_b$). As will be appreciated from the speed patterns P1 to P3, when the seek operation is started, the pulse rate f is increased from "0" to accelerate the stepping motor 20. Then, the pulse rate f is maintained at a constant value to rotate the stepping motor at a constant speed. And, when the number of the cylinders passed reaches "n", the pulse rate f begins to be decreased to decelerate the stepping motor 20. In this case, two stages of deceleration are effected to stop the stepping motor 20. At the first stage of the deceleration, the pulse rate f is decreased at a higher rate to quickly reduce the speed of the motor 20, and at the second stage of deceleration, the pulse rate f is decreased at a lower rate to reduce the speed of the motor 20 gradually. When the number of the cylinders passed becomes equal to "n", the pulse rate f is rendered "0" to stop the motor 20. It will be also appreciated from FIG. 3 that the pulse rate f of the speed pattern P1 at the flat portion is the highest, and that of the speed pattern P3 is the lowest. More specifically, when the supply voltage $V_B$ is high, the motor 20 is accelerated and decelerated quickly and is rotated at a higher constant speed at the flat portion of the speed pattern. On the other hand, when the supply voltage $V_B$ is low, the motor is accelerated and decelerated gently and is rotated at a lower constant speed at the flat portion of the speed pattern.

The speed patterns P1 ($V_B \geq V_a$), P2 ($V_a > V_B \geq V_b$) and P3 ($V_B < V_b$) are stored respectively in the the tables $TB_1$, $TB_2$ and $TB_3$ in the area $A_n$. In this case, each speed pattern is stored in such a manner that the pulse duration (or pulse period) at the ith cylinder represented by the reciprocal number of the pulse rate f is stored in the ith memory location of the corresponding table. More specifically, the reciprocal of the value $f_{1(j)}$ of the speed pattern P1 at the jth cylinder is stored in the jth memory location $L_{1(j)}$ of the table $TB_1$ in the area $A_n$, the reciprocal of the value $f_{2(j)}$ of the speed pattern P2 at the jth cylinder in the memory location $L_{2(j)}$, and the reciprocal of the value $f_{3(j)}$ of the speed pattern P3 at the jth cylinder in the memory location $L_{3(j)}$. Similarly, the reciprocal of the value $f_{1(k)}$ of the speed pattern P1 at the kth cylinder is stored in the kth memory location $L_{1(k)}$ of the table $TB_1$ in the area $A_n$, the reciprocal of the value $f_{2(k)}$ in the memory location $L_{2(k)}$, and the reciprocal of the value $f_{3(k)}$ in the memory location $L_{3(k)}$.

Thus, the tables $TB_1$, $TB_2$ and $TB_3$ of each of the areas $A_1$ to $A_N$ store data representative of the pulse durations to provide the optimum speed patterns of the motor experimentally obtained at the three different supply voltages, respectively. And, when the heads are to be moved, that one of the areas $A_1$ to $A_N$ which corresponds to the number of the cylinders to be passed is selected. Then, the pulse-duration data is read from the memory location of one of the tables $TB_1$ to $TB_3$, which memory location corresponds to the number of the cylinder which the heads are about to pass. And, the states of the four phase signals A to D for actuating the windings of the motor 20 are changed in accordance with the read pulse-duration data, to thereby rotate the motor at the optimum speed selected in accordance with the supply voltage $V_B$.

Figure 4:
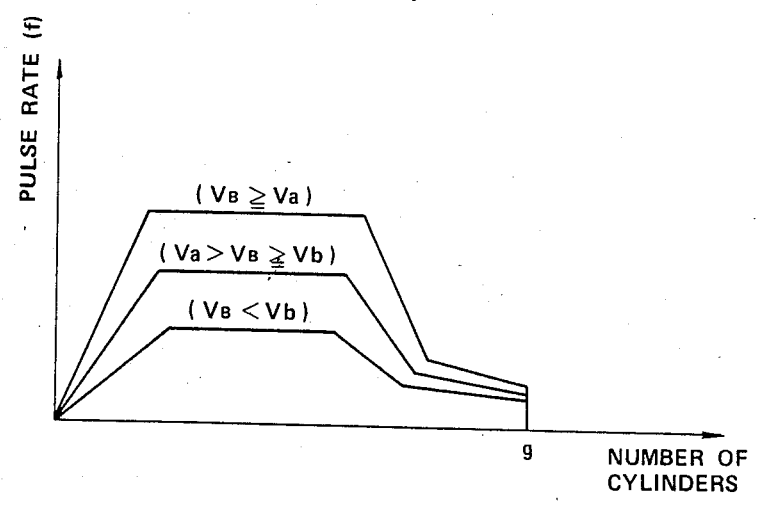
FIG. 4 is a graph similar to FIG. 3 but showing the optimum speed patterns experimentally obtained when the heads are moved across cylinders of which number is "g"

FIG. 4 shows speed patterns of the motor 20 which are used when the number of the cylinders to be passed is "g" (g<n). These speed patterns are stored in the tables $TB_1$ to $TB_3$ in the area $A_g$ (not shown) in a manner described for the speed patterns P1 to P3 shown in FIG. 3.

The operation of the control circuit 10 will now be described with reference to a flow chart shown in FIG. 5.

A seek operation of this disc storage unit is started when the CPU 14 receives data representative of the number of the cylinders to be passed from a host controller 50 and stores it into the work memory 16 at step S1 (it is assumed here that the number of the cylinders to be passed is "n"). Then, the CPU 14 stores data representative of "0" into a predetermined memory location SC in the work memory 16 at step S2. At the next step S3, the CPU 14 reads from the A/D converter 12 the data representative of the voltage $V_B$, then at the next step S4 the CPU 14 causes the output port 18 to change and then hold the states of the phase signals A to D to thereby rotate the rotor 21 of the stepping motor 20 by one step. Then, at the next step S5, the CPU 14 compares the data read from the A/D converter 12 with the data representative of the aforesaid first and second reference voltages $V_a$ and $V_b$ previously stored in the program memory 15.

(1) If it is determined at the step S5 that the voltage $V_B$ is not less than the first reference voltage $V_a$ ($V_B \geq V_a$), the CPU 14 calculates, at step S6, the starting address of the table $TB_1$ in the area $A_n$ which corresponds to the number of the cylinders to be passed.

(2) If it is determined at the step S5 that the voltage $V_B$ is less than the first reference voltage $V_a$ but not less than the second reference voltage $V_b$ ($V_a > V_B \geq V_b$), the CPU 14 calculates, at step S7, the starting address of the table $TB_2$ in the area $A_n$ which corresponds to the numbers of the cylinders to be passed.

(3) If it is determined at the step S5 that the voltage $V_B$ is less than the second reference voltage $V_b$ ($V_B < V_b$), the CPU 14 calculates the starting address of the table $T_3$ in the area $A_n$ which corresponds to the number of the cylinders to be passed.

Then, at step S9, the CPU 14 adds the starting address obtained by the calculation at the step S6, S7 or S8 to the contents of the memory location SC and temporarily stores the result of the addition in a memory location PC in the work memory 16. At the next step S10, the CPU outputs the contents of the memory location PC to the ROM 19 as address data to read the pulse-duration data contained in the memory location of the ROM 19 designated by the address data, and at the same time triggers the timer circuit 17 with the pulse-duration data. Then, at the step S11, the CPU 14 determines in accordance with the output of the timer circuit 17 whether a time interval represented by the read pulse-duration data has lapsed. This step S11 is repeated until the time has lapsed, and when the time has lapsed the processing proceeds to the next step S12. At this step S12, the CPU 14 increments the contents of the memory location SC by one and determines whether the contents thereof becomes equal to the number of the cylinders to be passed stored in the work memory 16. If it is determined that the contents of the memory location SC is equal to the number of the cylinders to be passed, the processing in this seek operation is terminated. On the other hand, if it is determined at the step S12 that the contents of the memory location SC do not coincide to the number of the cylinders to be passed, the processing returns to the step S3 whereupon the output of the A/D converter 12 is read and then the states of the phase signals A to D are again changed to rotate the rotor 21 of the stepping motor 20 by one step. Then, in the similar manner, the next pulse-duration data is read from the table in the area $A_n$ of the ROM 19 which is designated in accordance with the read voltage $V_B$. And when a time interval represented by the read pulse-duration data has lapsed, the rotor 21 of the motor 20 is again rotated by one step. And thereafter, the above processing is repeated until the rotor 21 is rotated by the number of steps corresponding to the number of the cylinders to be passed.

As described above, according to the control circuit 10 shown in FIG. 1, the speed pattern of the stepping motor 20 is determined in accordance with the supply voltage $V_B$ so that the optimum acceleration and deceleration of the motor can be achieved. And therefore, the control circuit 10 can drive the stepping motor 20 within a wide supply voltage range without step-out of the rotor 21.

With the control circuit 10 of FIG. 1, the range of the supply voltage $V_B$ are divided into three to determine the current level thereof. It should be noted however that it is also possible to divide the range of the supply voltage $V_B$ into more than three to determine the current level thereof more precisely.

Figure 5:
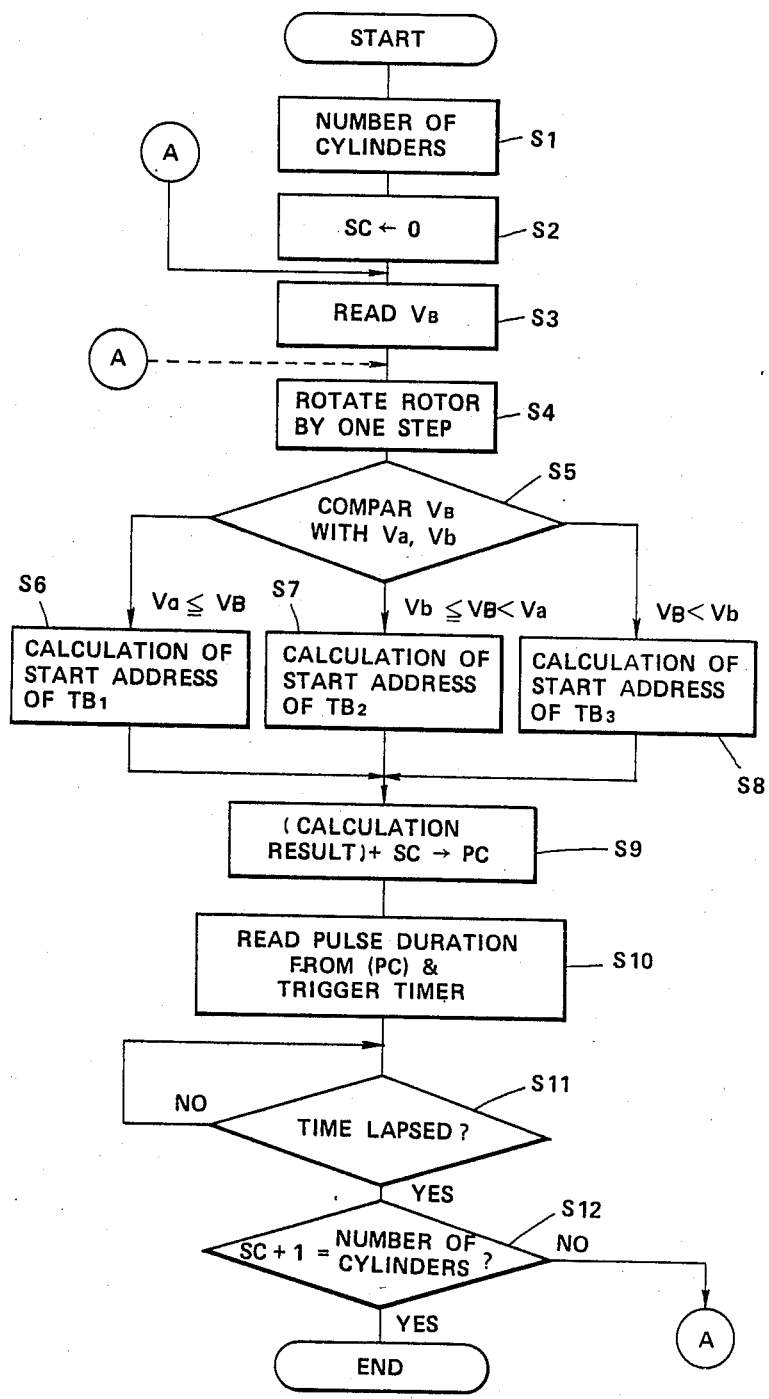
FIG. 5 is a flow chart of the operation of the control circuit 10 of FIG. 1.

With the control circuit 10, the data representative of the supply voltage $V_B$ is read from the A/D converter 12 each time the rotor 21 is rotated by one step, as seen from the flow chart of FIG. 5. It will be, however, apparent that the control circuit 10 may be modified such that the data representative of the supply voltage $V_B$ is read only once at the beginning of the seek operation, and the same data is used within the seek operation, as indicated by the broken line in FIG. 5. In this case, pulse duration data are read from the same table to control the speed of the motor 20.

Also, it is not essential to provide the ROM 19 separately from the program memory 15. The speed control data may be stored in the program memory 15 with the control programs.

What is claimed is:

1. A control circuit for controlling the operation of a stepping motor having windings which are supplied with a voltage from a voltage source comprising:
    (a) voltage detecting means for detecting a level of the voltage to output a detection signal;
    (b) memory means for storing a plurality of speed pattern data corresponding respectively to different levels of the voltage;
    (c) reading means for selectively reading one of said plurality of speed pattern data in accordance with said detection signal; and
    (d) drive means for causing phase currents to flow from the voltage source into the windings in accordance with said speed pattern data read from said memory means.

2. A control circuit according to claim 1 further comprising register means for receiving data representative of the number of steps by which the stepping motor is operated, and wherein said memory means comprises a plurality of storage areas which correspond respectively to the different numbers of steps by which the stepping motor is operated, each area storing a plurality of speed pattern data, said reading means selecting one of the storage areas in accordance with the data stored in said register means and selectively reading one of said plurality of speed pattern data in the selected storage area in accordance with said detection signal.

3. A control circuit according to claim 2 further comprising timer means responsive to a timer data for measuring a lapse of a time represented by said timer data, and wherein each of said plurality of speed pattern data comprises a series of timer data, said reading means cooperating with said timer means to read the series of timer data of said selected speed pattern data one by one at time intervals determined respectively by said series of timer data, said drive means changing states of said phase currents in accordance with said determined time intervals.

4. A control circuit according to claim 3, wherein said voltage detecting means comprises an analog-to-digital converter.

* * * * *